(12) United States Patent
Hashimoto et al.

(10) Patent No.: US 9,249,707 B2
(45) Date of Patent: Feb. 2, 2016

(54) VEHICLE

(71) Applicant: Toyota Jidosha Kabushiki Kaisha, Toyota-shi, Aichi-ken (JP)

(72) Inventors: Keita Hashimoto, Toyota (JP); Yuki Hamasaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/468,983

(22) Filed: Aug. 26, 2014

(65) Prior Publication Data

US 2015/0075142 A1 Mar. 19, 2015

(30) Foreign Application Priority Data

Sep. 17, 2013 (JP) ................................. 2013-191784

(51) Int. Cl.
| | |
|---|---|
| *F01N 3/20* | (2006.01) |
| *F01N 9/00* | (2006.01) |
| *B60W 20/00* | (2006.01) |
| *F01N 3/08* | (2006.01) |
| *B01D 53/50* | (2006.01) |
| *F02D 41/02* | (2006.01) |

(52) U.S. Cl.
CPC .............. *F01N 3/2013* (2013.01); *B01D 53/50* (2013.01); *B60W 20/00* (2013.01); *F01N 3/0885* (2013.01); *F01N 9/00* (2013.01); *F01N 3/2026* (2013.01); *F01N 2240/16* (2013.01); *F01N 2390/02* (2013.01); *F01N 2430/06* (2013.01); *F01N 2590/11* (2013.01); *F01N 2900/12* (2013.01); *F01N 2900/1612* (2013.01); *F02D 41/028* (2013.01); *F02D 41/0245* (2013.01); *Y10S 903/903* (2013.01)

(58) Field of Classification Search
CPC ..... F01N 3/0885; F01N 3/101; F01N 3/2026; F01N 9/00; F01N 2240/16; F01N 2260/04; F01N 2390/02; F01N 2430/06; F01N 2550/02; F01N 2550/22; F01N 2570/04; F01N 2590/11; F01N 2900/0602; F01N 2900/104; F01N 2900/12; F01N 2900/1602; F01N 2900/1612; B01D 53/50; Y10S 903/903
USPC ........... 60/275, 277, 285, 286, 295, 300, 303, 60/320; 180/65.21; 477/100; 903/902
See application file for complete search history.

(56) References Cited

U.S. PATENT DOCUMENTS

| | | | | |
|---|---|---|---|---|
| 2009/0211233 A1* | 8/2009 | Watanabe | ............ | F01N 3/2013 60/277 |
| 2012/0125705 A1* | 5/2012 | Hashimoto | ............ | B60K 6/445 180/69.6 |

FOREIGN PATENT DOCUMENTS

| | | |
|---|---|---|
| JP | 2011-032969 A | 2/2011 |
| JP | 2012-057576 A | 3/2012 |

* cited by examiner

*Primary Examiner* — Thomas Denion
*Assistant Examiner* — Jorge Leon, Jr.
(74) *Attorney, Agent, or Firm* — Dinsmore & Shohl LLP

(57) ABSTRACT

In a plug-in hybrid vehicle that includes an EHC, an ECU eliminates a sulfur poisoned state by supplying external electric power to the EHC when it is necessary to eliminate a state in which adhesion to a catalyst in the EHC degrades a function of the catalyst and external charging is being performed. On the other hand, when it is necessary to eliminate the sulfur poisoned state, the external charging is not being performed, and operation of an engine is permitted, the sulfur poisoned state is eliminated by operating the engine.

3 Claims, 2 Drawing Sheets

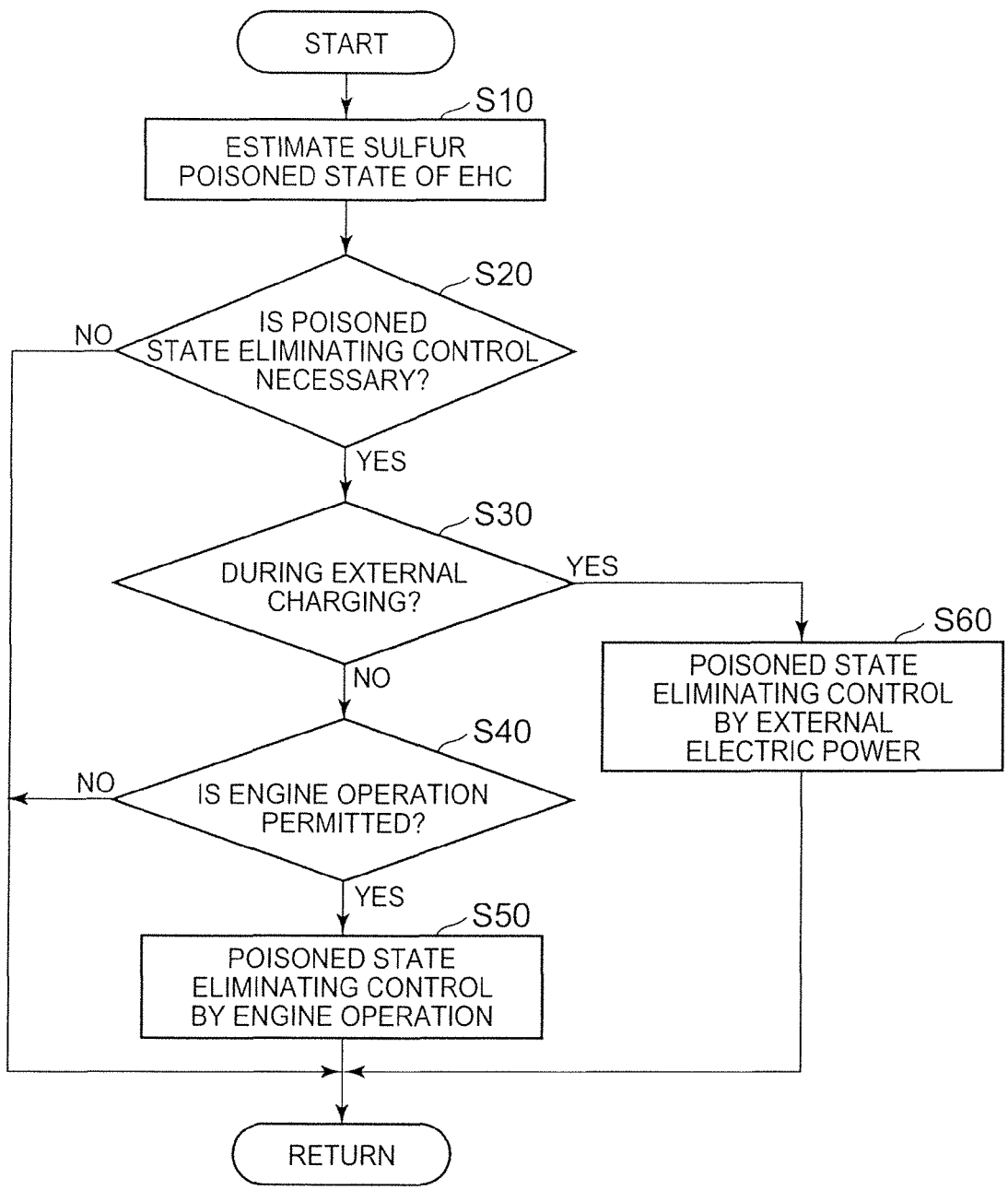

VEHICLE

INCORPORATION BY REFERENCE

The disclosure of Japanese Patent Application No. 2013-191784 filed on Sep. 17, 2013 including the specification, drawings and abstract is incorporated herein by reference in its entirety.

BACKGROUND OF THE INVENTION

1. Field of the Invention

The present invention relates to a vehicle, and in particular to a vehicle that includes an electrically heated catalyst for purifying exhaust gas of an engine.

2. Description of Related Art

A vehicle has been known that includes an electrically heated catalyst (hereinafter also referred to as an "EHC") for purifying exhaust gas of an engine. The EHC contains a catalyst and an electric heater for heating the catalyst. It has been known that, performance of the catalyst is degraded when a sulfur content that is contained in the exhaust gas of the engine adheres to the catalyst. A state in which adhesion of the sulfur content causes the reduced performance of the catalyst is referred to as a "sulfur poisoned state". Once the catalyst is brought into the sulfur poisoned state, purifying performance of the catalyst is degraded, and emissions may consequently be deteriorated. Accordingly, it is desired to eliminate the sulfur poisoned state.

If a temperature of the catalyst is a specified temperature (500° C., for example) or higher, and if a sufficient amount of oxygen (an oxidant) is available, the sulfur content, which is adhered to the catalyst, is oxidized and desorbed from the catalyst. Consequently, the sulfur poisoned state is eliminated.

Japanese Patent Application Publication No. 2012-57576 (JP 2012-57576 A) discloses a technique in which the sulfur poisoned state is efficiently eliminated by supplying electricity to the EHC to increase the temperature of the catalyst and by operating the engine in such a manner that air-fuel ratio of the exhaust gas of the engine becomes leaner (contains more oxygen) than theoretical air-fuel ratio when the catalyst is brought into the sulfur poisoned state.

In recent years, attentions have been paid to a hybrid vehicle in which a built-on battery can be charged by external electric power from an external electric power source (hereinafter referred to as a "plug-in hybrid vehicle"). In the plug-in hybrid vehicle, fuel economy is improved by preferentially consuming the electric power stored in a battery over engine fuel until a remaining capacity of the battery becomes lower than a lower limit (that is, the electric power stored in the battery is used up). Accordingly, opportunities to operate the engine may be much less for the plug-in hybrid than for a normal hybrid vehicle or a vehicle driven by an engine.

As described above, JP 2012-57576 A discloses the technique to efficiently eliminate the sulfur poisoned state of the catalyst by concurrently using electric power supply to the EHC and the exhaust gas of the engine.

SUMMARY OF THE INVENTION

However, the technique disclosed in JP 2012-57576 A is made on the premise that the engine is operated. Thus, if this technique is applied to the plug-in hybrid vehicle, the opportunities to operate the engine may be extremely limited depending on a way to use the vehicle by a user. Consequently, it is concerned that the sulfur poisoned state cannot be eliminated appropriately.

Therefore, an object of the present invention is to appropriately and efficiently remove a sulfur content that is adhered to an electrically heated catalyst for purifying exhaust gas of an engine in a plug-in hybrid vehicle.

A vehicle according to one aspect of the present invention is a vehicle that can travel by using power from at least one of an engine and a motor and in which an electric power storage device for storing electric power for driving the motor can be charged by external electric power supplied from an external electric power source of the vehicle. This vehicle includes an electrically heated catalyst for purifying exhaust gas of the engine and a control unit for executing control for eliminating a sulfur poisoned state of the catalyst. The control unit executes a first eliminating control for eliminating the sulfur poisoned state by supplying the external electric power to the catalyst when it is necessary to eliminate the sulfur poisoned state and the external electric power source is connected to the vehicle.

According to such a configuration, the first eliminating control that uses the external electric power is executed while the external charging is being performed (when the external electric power source is connected to the vehicle). Thus, even when opportunities to operate the engine are limited during traveling of the vehicle and opportunities to eliminate the sulfur poisoned state are consequently reduced, it is possible to appropriately eliminate the sulfur poisoned state by executing the first eliminating control while the external charging is being performed. In addition, in the first eliminating control, since the external electric power that is generated in a high efficient manner is used to eliminate the sulfur poisoned state, the sulfur poisoned state can efficiently be eliminated. Consequently, it is possible in the plug-in hybrid vehicle to appropriately and efficiently remove a sulfur content that is adhered to the catalyst.

The control unit may execute a second eliminating control for eliminating the sulfur poisoned state by operating the engine when it is necessary to eliminate the sulfur poisoned state, the external electric power source is not connected to the vehicle, and the operation of the engine is permitted.

According to such a configuration, even during the travel of the vehicle (when the external electric power source is not connected to the vehicle), when the operation of the engine is permitted, the sulfur poisoned state can be eliminated by the second eliminating control that uses the engine operation.

Preferably, the first eliminating control may be control for securing an amount of oxygen around the catalyst while heating the catalyst by supplying the external electric power to the catalyst in a state that the engine is stopped. The second eliminating control may be control for securing the amount of oxygen around the catalyst while heating the catalyst by selectively supplying the electric power of the electric power storage device to the catalyst in a state that the engine is operated such that the amount of oxygen contained in exhaust gas of the engine is larger than that when it is not necessary to eliminate the sulfur poisoned state.

According to such a configuration, the sulfur poisoned state can be eliminated by either the first eliminating control or the second eliminating control. In other words, it has been known that the sulfur poisoned state is eliminated when a temperature of the catalyst is a specified temperature (500° C., for example) or higher and a sufficient amount of oxygen (an oxidant) is available around the catalyst. In the first eliminating control, the catalyst is heated by the external electric power in the state that the engine is stopped. Accordingly, the temperature of the catalyst can efficiently be increased to the specified temperature (500° C., for example) or higher in the state that the sufficient amount of oxygen (air) exists around the catalyst.

In the second eliminating control, the electric power of the electric power storage device is selectively supplied to the catalyst while the engine is operated. Accordingly, it is possible to increase the temperature of the catalyst to the specified temperature or higher in an early stage by concurrently using exhaust heat of the engine and the electric power of the electric power storage device. In addition, since the engine is operated such that the amount of oxygen contained in the exhaust gas is increased, oxygen can be supplied to a periphery of the catalyst. Thus, the sulfur poisoned state can be eliminated by either the first eliminating control or the second eliminating control.

According to the present invention, it is possible to appropriately and efficiently remove the sulfur content that is adhered to the electrically heated catalyst for purifying the exhaust gas of the engine in the plug-in hybrid vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a flowchart for showing process procedures of an ECU.

DETAILED DESCRIPTION OF EMBODIMENTS

Figure 1:
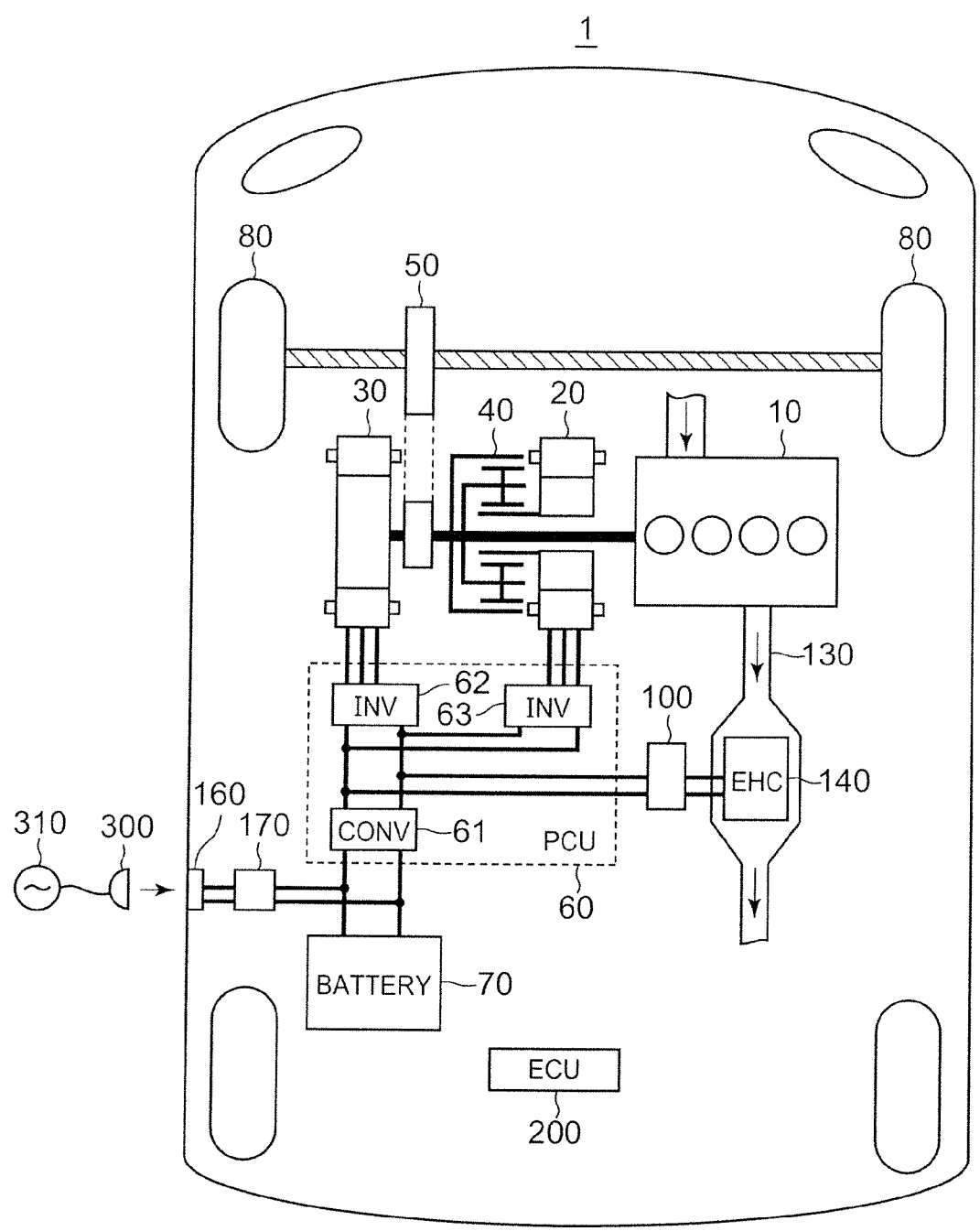
FIG. 1 is a schematic diagram of an overall structure of a vehicle.

A description will hereinafter be made on an embodiment of the present invention with reference to the drawings. In the following description, same components are denoted by same reference numerals. Names and functions thereof are also same. Thus, a detailed description thereon will not be repeated.

Even when specific numbers or quantities are mentioned in the following description, the scope of the present invention is not necessarily limited to such numbers or quantities unless otherwise noted.

FIG. 1 is a schematic diagram for showing an overall structure of a vehicle 1 according to this embodiment. The vehicle 1 includes an engine 10, a first motor generator 20, a second motor generator 30, a power dividing device 40, a speed reduction gear 50, a power control unit (PCU) 60, a battery 70, a drive wheel 80, and an electronic control unit (ECU) 200. The vehicle 1 also includes an exhaust passage 130, an electrically heated catalyst (EHC) 140, and a switching device 100. The vehicle 1 further includes a charging port 160 and a charger 170.

The vehicle 1 is a so-called plug-in hybrid vehicle. In other words, the vehicle 1 is configured that it can travel by power from at least one of the engine 10 and the second motor generator 30 and that the battery 70 for storing electric power to drive the second motor generator 30 can be charged by external electric power supplied from an external electric power source 310.

The engine 10, the first motor generator 20, and the second motor generator 30 are connected via the power dividing device 40. Power generated by the engine 10 is divided by the power dividing device 40 to go through a passage for transmission to the drive wheel 80 and to go through a passage for transmission to the first motor generator 20.

The first motor generator 20 generates the electric power by using the power of the engine 10, which is divided by the power dividing device 40. The electric power generated by the first motor generator 20 is supplied to the battery 70 and the second motor generator 30.

The second motor generator 30 generates drive power by using at least one of the electric power supplied from the battery 70 and the electric power generated by the first motor generator 20. Then, the drive power of the second motor generator 30 is transmitted to the drive wheel 80. During braking of the vehicle 1, the second motor generator 30 is driven by the drive wheel 80, and the second motor generator 30 is operated as a generator. Accordingly, the second motor generator 30 functions as a regenerative brake that converts kinetic energy of the vehicle 1 to electric energy. The electric power generated by the second motor generator 30 is stored in the battery 70 via the PCU 60.

At least any electric power of the electric power stored in the battery 70, the electric power generated by the first motor generator 20, and the electric power generated by the second motor generator 30 (hereinafter also referred to as the "internal electric power") can also be supplied to the EHC 140 as will be described below.

The battery 70 is a DC electric power storage device that stores the electric power for driving the first motor generator 20 and the second motor generator 30.

The PCU 60 includes a converter 61, an inverter 62, and an inverter 63. The converter 61 converts a voltage between the battery 70 and the inverter 62 as well as between the battery 70 and the inverter 63. The inverter 62 and the inverter 63 are connected in parallel with each other with respect to the converter 61. The inverter 62 converts the electric power between the converter 61 and the first motor generator 20. The inverter 63 converts the electric power between the converter 61 and the second motor generator 30.

The exhaust gas of the engine 10 is discharged to the atmosphere through the exhaust passage 130. The electrically heated catalyst (EHC) 140 is provided in the middle of the exhaust passage 130.

The EHC 140 includes a catalyst (three-way catalyst) for purifying the exhaust gas of the engine 10 and an electric heater for heating the catalyst. Any of various known EHCs can be adopted as the EHC 140.

In this embodiment, the EHC 140 is electrically connected to the PCU 60 via the switching device 100. More specifically, the electric heater, which is included in the EHC 140, is connected to electric power lines between the converter 61 and the inverter 62 and between the converter 61 and the inverter 63 via the switching device 100.

The switching device 100 includes a relay therein, and opens and closes the relay to electrically connecting/disconnecting the EHC 140 and/from the PCU 60. In other words, the electric power supply to the EHC 140 and stop thereof are switched by controlling the switching device 100 (opening and closing the relay therein).

The charging port 160 is an electric power interface for receiving system electric power that is supplied from the external electric power source 310 (hereinafter referred also to as the "external electric power"). The charging port 160 is configured such that a charging connector 300 connected to the external electric power source 310 can be connected to the charging port 160.

The charger 170 is electrically connected to the charging port 160 and the battery 70. Then, the charger 170 converts the external electric power from the charging port 160 to chargeable electric power for the battery 70, and supplies the chargeable electric power to the battery 70. Accordingly, the battery 70 is charged by the external electric power. To charge the battery 70 by the external electric power is hereinafter also referred to as "external charging". As will be described below, the external electric power can also be supplied to the EHC 140.

The ECU 200 includes a central processing unit (CPU) and a memory, which are not shown, executes specified arithmetic processing on the basis of information stored in the memory, and controls various components of the vehicle 1 on the basis of a result of the arithmetic processing. Although the ECU 200 is shown as a single unit in FIG. 1, the ECU 200 may be divided into two units or more.

In the vehicle 1 as the plug-in hybrid vehicle, it is preferred in terms of energy efficiency that the electric power of the battery 70, which is charged by the external electric power, is preferentially consumed over fuel of the engine 10. Accordingly, in one trip (a period from activation of a vehicle system to termination thereof), the ECU 200 does not permit the operation of the engine 10 to charge the battery 70 until a remaining capacity of the battery 70 is reduced to a lower limit value (that is, the electric power of the battery 70 is used up). The operation of the engine 10 is permitted only when user requested power exceeds the power that can be output by the battery 70 or when a warming request is made, for example. Meanwhile, after the remaining capacity of the battery 70 is reduced to the lower limit value in the one trip, the operation of the engine 10 is permitted to charge the battery 70, in addition to the case where the user requested power exceeds the power that can be output by the battery 70 and the case where the warming request is made.

Thus, depending on a way to use the vehicle by the user, the engine 10 is mostly maintained to be stopped, and the vehicle 1 can thereby travel by the power of the second motor generator 30 (the electric power of the battery 70). For example, when a short distance travel is repeated to commute or the like, the engine 10 is maintained to be stopped, and the vehicle 1 can thereby travel by the electric power of the battery 70, unless the user requests high power or makes the warming request.

Next, a description will be made on control to remove sulfur that is adhered to the catalyst in the EHC 140. The exhaust gas of the engine 10 contains a sulfur content in the fuel of the engine 10. When a temperature of the catalyst is lower than a specified temperature (500° C., for example), the sulfur content is likely to be adhered to the catalyst. It has been known that purifying performance of the catalyst is degraded once the sulfur content is adhered to the catalyst. A state in which adhesion of the sulfur content causes the degraded purifying performance of the catalyst is also referred to as a "sulfur poisoned state". Once the catalyst is brought into the sulfur poisoned state, the purifying performance of the catalyst is degraded, and emissions may consequently be deteriorated. Accordingly, it is desired to eliminate the sulfur poisoned state (remove sulfur that is adhered to the catalyst).

If the temperature of the catalyst is the specified temperature (500° C., for example) or higher, and if a sufficient amount of oxygen (an oxidant) is available, the sulfur content, which is adhered to the catalyst, is oxidized and desorbed from the catalyst. Consequently, the sulfur poisoned state is eliminated. At this time, the more amount of oxygen allows faster recovery from the sulfur poisoned state.

As control to eliminate the sulfur poisoned state of the catalyst in the vehicle equipped with the EHC, it is considered to efficiently eliminate the sulfur poisoned state by concurrently using the exhaust gas of the engine and the electric power supply to the EHC. However, this technique is made on the premise that the engine is operated. Accordingly, if this technique is applied to the plug-in hybrid vehicle in which the opportunities to operate the engine are limited, it is concerned that the sulfur poisoned state cannot be eliminated appropriately.

In other words, in the vehicle 1 as the plug-in hybrid vehicle, when the remaining capacity of the battery 70 is sufficient, the opportunities to operate the engine 10 are limited. Even if the engine 10 is operated, such operation tends to be light load operation. Thus, when the engine 10 is started, the catalyst is in a cold state (a state in which sulfur can easily be adhered). Even after the engine 10 is started, a temperature of the exhaust gas remains low, and the temperature of the catalyst does not increase in an early stage. Consequently, the state in which sulfur can easily be adhered to the catalyst persists for a while. In addition, since the opportunities to operate the engine 10 are limited in the first place, opportunities to execute control for eliminating the sulfur poisoned state also become limited. Accordingly, it is concerned that the sulfur poisoned state cannot be eliminated appropriately.

As another method for eliminating the sulfur poisoned state, it can be considered to increase the temperature of the exhaust gas to consequently increase the temperature of the catalyst to the specified temperature or higher by high load operation of the engine 10 even when the remaining capacity of the battery 70 is sufficient, for example. However, fuel economy is degraded by this method. A technique is also possible that the electric power of the battery 70 is supplied to the EHC 140 to increase the temperature of the catalyst to the specified temperature or higher only by the electric power of the battery 70 in a state that the engine 10 is stopped. However, by this method, the remaining capacity of the battery 70 is reduced in the early stage, and thus a possible EV travel distance (a distance that the vehicle can travel by using the power of the second motor generator 30 without using the power of the engine 10) is reduced.

Accordingly, the ECU 200 according to this embodiment eliminates the sulfur poisoned state of the catalyst by operating the engine during travel of the vehicle, and also eliminates the sulfur poisoned state of the catalyst by supplying the external electric power to the EHC 140 during the external charging.

FIG. 2 is a flowchart for showing process procedures when the ECU 200 executes control for eliminating the sulfur poisoned state of the catalyst. The process in this flowchart is repeatedly executed at specified intervals while the ECU 200 is operated.

In a step (hereinafter abbreviated as "S") 10, the ECU 200 estimates the sulfur poisoned state of the EHC 140. The ECU 200 estimates the temperature of the catalyst, which is contained in the EHC 140, from an engine speed or the like, calculates an integrated value of an intake air amount of the engine 10 when the estimated temperature of the catalyst is the specified temperature (500° C., for example) or lower, and estimates the sulfur poisoned state (an amount of the sulfur content that is adhered to the catalyst) with the thus-calculated integrated value as a parameter. The ECU 200 may use another parameter to estimate the sulfur poisoned state.

The ECU 200 determined in S20 whether it is necessary to eliminate the sulfur poisoned state. The ECU 200 determines that it is necessary to eliminate the sulfur poisoned state when the integrated value of the intake air amount (the estimated amount of the sulfur content that is adhered to the catalyst), which is calculated in S10, exceeds a threshold value. If it is not necessary to eliminate the sulfur poisoned state (NO in S20), the ECU 200 terminates the process.

If it is necessary to eliminate the sulfur poisoned state (YES in S20), the ECU 200 determines whether the external charging is being performed (S30). Here, "DURING EXTERNAL CHARGING" in this determination is not necessarily limited to a state that the battery 70 is actually charged by the external electric power source, but also includes a state that the battery 70 can be charged by the external electric power source. For example, the ECU 200 determines that the external charging is being performed when the charging connector 300 is connected to the charging port 160 and the external electric power is supplied to the charging port 160.

If the external charging is not being performed (NO in S30), the ECU 200 determines whether the operation of the engine 10 by a higher load than a specified load is permitted (S40). Here, the "specified load" is a load that is necessary for the process in S50 (poisoned state eliminating control by the engine operation), which will be described below.

If the external charging is not being performed (NO in S30), and if the operation of the engine 10 by the higher load than the specified load is not permitted (NO in S40), the ECU 200 does not execute the poisoned state eliminating control and terminates the process.

If the external charging is not being performed (NO in S30), and if the operation of the engine 10 by the higher load than the specified load is permitted (YES in S40), the ECU 200 executes the poisoned state eliminating control by the engine operation (S50).

More specifically, the ECU 200 operates the engine 10 such that an amount of oxygen contained in the exhaust gas of the engine 10 is larger than that when it is not necessary to eliminate the sulfur poisoned state (such that an air-fuel ratio of the exhaust gas of the engine 10 becomes leaner than the theoretical air-fuel ratio). For example, a time period in which the air-fuel ratio of the exhaust gas is leaner than the theoretical air-fuel ratio may be set longer than a time period in which the air-fuel ratio becomes rich. In addition, the fuel supply to the engine 10 may temporarily be stopped when a throttle valve is completely closed and the engine speed is sufficiently high. If the engine 10 is operated as described above, it is possible to heat the catalyst by exhaust heat of the engine 10 and secure the amount of oxygen around the catalyst.

Furthermore, when the remaining capacity of the battery 70 is sufficient, the ECU 200 supplies the internal electric power to the EHC 140 and heats the catalyst by the internal electric power. Just as described, in the poisoned state eliminating control by the engine operation, not only the exhaust heat of the engine 10, but heating of the EHC by the internal electric power is selectively and concurrently used. Thus, the temperature of the catalyst can efficiently be increased to the specified temperature or higher.

The process in S50 (the poisoned state eliminating control by the engine operation) may be terminated when it is estimated that the catalyst is recovered from the poisoned state (for example, when it is estimated that a state in which the temperature of the catalyst exceeds the specified temperature persists for a specified time period).

Meanwhile, if the external charging is being performed (YES in S30), the ECU 200 executes the poisoned state eliminating control by the external electric power (S60). More specifically, the ECU 200 controls the charger 170, the converter 61, and the switching device 100 such that the external electric power is supplied to the EHC 140, thereby heating the catalyst by the external electric power.

Since the engine 10 is maintained to be stopped during the external charging, the sufficient amount of oxygen (air) is secured around the catalyst. Thus, the temperature of the catalyst can efficiently be increased to the specified temperature (500° C., for example) or higher in a state that the sufficient amount of oxygen (the air) exists around the catalyst.

Particularly, the external electric power is the efficiently generated system electric power (electric efficiency is approximately 80%). Accordingly, compared to a case where the electric power that is generated by the first motor generator 20 using the power of the engine 10 (combustion efficiency is approximately 30%) is used, the temperature of the catalyst can be increased further efficiently.

The process in S60 (the poisoned state eliminating control by the external electric power) may be terminated when it is estimated that the catalyst is recovered from the poisoned state (for example, when it is estimated that the state in which the temperature of the catalyst exceeds the specified temperature persists for the specified time period).

As it has been described so far, in the vehicle 1 (the plug-in hybrid vehicle) that includes the EHC 140, the ECU 200 according to this embodiment eliminates the sulfur poisoned state by supplying the external electric power to the EHC 140 when it is necessary to eliminate the sulfur poisoned state and the external charging is being performed. Accordingly, even when the opportunities to operate the engine 10 are limited during the traveling of the vehicle and the opportunities to eliminate the sulfur poisoned state are consequently reduced, it is possible to appropriately and efficiently eliminate the sulfur poisoned state by using the external electric power that is generated in a high efficient manner during the external charging.

While the exemplary embodiments have been described, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less, or only a single element, are also within the spirit and scope of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
   an engine;
   a motor, the vehicle traveling by using power from at least one of the engine and the motor;
   an electric power storage device configured to store electric power for driving the motor, the electric power storage device being chargeable by external electric power supplied from an external electric power source of the vehicle;
   a catalyst configured to purify exhaust gas of the engine, the catalyst being heated by using electricity; and
   an electronic control unit configured to:
   (a) execute control for eliminating a sulfur poisoned state of the catalyst; and
   (b) execute a first eliminating control for eliminating the sulfur poisoned state by supplying the external electric power to the catalyst when it is necessary to eliminate the sulfur poisoned state and the external electric power source is connected to the vehicle.

2. The vehicle according to claim 1, wherein
the electronic control unit is configured to execute a second eliminating control for eliminating the sulfur poisoned state by operating the engine when it is necessary to eliminate the sulfur poisoned state, the external electric power source is not connected to the vehicle, and the operation of the engine is permitted.

3. The vehicle according to claim 2, wherein
the first eliminating control is control for securing an amount of oxygen around the catalyst while heating the catalyst by supplying the external electric power to the catalyst in a state that the engine is stopped, and
the second eliminating control is control for securing the amount of oxygen around the catalyst while heating the catalyst by selectively supplying the electric power of the electric power storage device to the catalyst in a state that the engine is operated such that the amount of oxygen contained in the exhaust gas of the engine is larger than that when it is not necessary to eliminate the sulfur poisoned state.

* * * * *